(12) United States Patent
Tirkkonen

(10) Patent No.: US 7,363,004 B2
(45) Date of Patent: Apr. 22, 2008

(54) FEEDBACK INFORMATION FOR CONTROLLING TRANSMISSION IN A COMMUNICATION SYSTEM

(75) Inventor: Olav Tirkkonen, Helsinki (FI)

(73) Assignee: Nokia Corporation, Espoo (FI)

( * ) Notice: Subject to any disclaimer, the term of this patent is extended or adjusted under 35 U.S.C. 154(b) by 787 days.

(21) Appl. No.: 10/778,207

(22) Filed: Feb. 17, 2004

(65) Prior Publication Data

US 2005/0075071 A1    Apr. 7, 2005

(30) Foreign Application Priority Data

Oct. 3, 2003    (FI) .................................. 20031441

(51) Int. Cl.
*H04B 7/14*    (2006.01)

(52) U.S. Cl. ..................... 455/24; 455/434; 455/67.11; 375/267

(58) Field of Classification Search ................ 455/24, 455/561, 562.1, 502, 504, 101, 434, 67.11, 455/515; 375/267, 141, 279; 714/792, 755
See application file for complete search history.

(56) References Cited

U.S. PATENT DOCUMENTS 5,170,410 A * 12/1992 Gressier et al. ............. 375/141

| | | | |
|---|---|---|---|
| 2001/0033622 A1 * | 10/2001 | Jongren et al. | 375/267 |
| 2002/0009156 A1 * | 1/2002 | Hottinen et al. | 375/267 |
| 2002/0059551 A1 * | 5/2002 | Alamouti | 714/792 |
| 2003/0017835 A1 * | 1/2003 | Bergel | 455/502 |
| 2004/0001556 A1 * | 1/2004 | Harrison et al. | 375/267 |
| 2006/0262832 A1 * | 11/2006 | Kaewell, Jr. | 375/141 |
| 2007/0130494 A1 * | 6/2007 | Divsalar et al. | 714/755 |

OTHER PUBLICATIONS

Hamalainen, J., et al., *"Performance Analysis of Closed-Loop Transmit Diversity in the Presence of Feedback Errors"*, The 13 IEEE International Symposium on Personal, Indoor and Mobile Radio Communications, Sep. 2002, vol. 5. pp. 2297-2301.

* cited by examiner

*Primary Examiner*—Tan Trinh
(74) *Attorney, Agent, or Firm*—Squire Sanders & Dempsey L.L.P.

(57) ABSTRACT

A method is discussed for generating feedback information for controlling transmission from a transmitting end using a set of feedback symbols. The feedback information comprises a set of feedback words. At least one feedback symbol is determined based on at least one signal received from the transmitting end. A feedback word to be transmitted to the transmitting end is determined, the feedback word relating to the determined feedback symbol, by a mapping between said set of feedback symbols and said set of feedback words. This mapping takes into account the effect of at least one possible transmission error in transmitting the feedback word to the transmitting end. Furthermore, the mapping is different from a mapping relating to Gray encoding.

29 Claims, 9 Drawing Sheets

FEEDBACK INFORMATION FOR CONTROLLING TRANSMISSION IN A COMMUNICATION SYSTEM

FIELD OF THE INVENTION

The present invention relates to providing feedback information in a wireless communication system. In particular, the present invention relates to providing feedback information for controlling transmission.

BACKGROUND OF THE INVENTION

A communication system can be seen as a facility that enables communication between two or more entities such as user equipment and/or other nodes associated with the system. The communication may comprise, for example, communication of voice, data, multimedia and so on. The communication system may be circuit switched or packet switched. The communication system may be configured to provide wireless communication.

At least some signaling is typically required in order to control a communication session. Communication between the user equipment and the entities of the communication network and the signaling can be based on an appropriate communication protocol or protocols.

Feedback information is needed for controlling the transmission in many communication systems. Especially in frequency division duplex (FDD) systems, where transmission and reception occur at different frequencies, it may not be possible to deduce channel information of a channel, on which a device transmits to a second device, based on a channel, on which signals are received from the second device. In time division duplex (TDD) systems, transmission and reception occur at the same frequency, so channel information is usually readily available.

Feedback information may relate to transmission power control or to control of transmission more generally. Often feedback information is related to a continuous quantity, or otherwise an ordering is induced. This means that one may define a metric in the space of feedback symbols relaying feedback information so that some possible feedback symbols are closer neighbors than some others. If the feedback is based on a continuous quantity, the corresponding metric may be taken as a Euclidean metric in the space of the continuous quantities. For example, in many transmit diversity methods, where the phase difference between two or more signals sent from two or more antennas is adjusted, feedback information is needed for proper adjustment of the phase difference. Feedback information may also be used to control both phase and amplitude of transmission. In these cases, the metric defining proximity may be taken as the Euclidean metric on the plane.

When feedback information is conveyed from the receiving end of the communication link to the transmitting end, digital communication is often used. For this, the feedback information describing continuous quantities has to be quantized using a predefined quantization method. Such quantized numbers are often called feedback symbols. Typically feedback symbols are then described in terms of a set of binary feedback words. Information about this feedback symbol is sent to the transmitter by sending the determined feedback word as feedback signaling. After receiving the binary feedback signaling, the transmitter controls transmission. Often the transmitter constructs the feedback symbols from the received feedback signaling i.e. quantized estimates of the continuous quantities (phase, amplitude, complex number) and uses them directly to control transmission. For example, phase shift keying modulation symbols may be used to indicate how to modify the phase difference of two signals sent to a receiver. Usually a mapping called Gray encoding is used for transmitting signaling information and for transmitting feedback information.

Usually information to be transmitted over a wireless link is protected against transmission errors. This protection can be performed, for example, by adding some error detection/correction codes or by adding redundancy by partially repeating the information to be transmitted. Feedback signaling is typically unprotected for enabling fast transmission of the feedback information and for saving transmission resources. This means that feedback signaling is error-prone. A bit error in feedback information may result in the use of a wrong feedback symbol in transmission control. For example in WCDMA (Wideband Code Division Multiple Access) standardization it is assumed that that the bit error rates (BER) for unprotected feedback signaling is about 4-10%.

To overcome at least some of the problems relating to bit errors in transmitting feedback information, a concept of verification has been introduced in some diversity methods, for example in Mode 2 diversity in WCDMA system. In verification the receiver tries, after sending feedback information, to deduce from the signals sent by the transmitter which feedback symbol the transmitter is employing in the transmission control. The verification is typically based on pilot signals (or other signals whose information content is known to the receiver) and on the signals whose transmission is controlled using the feedback information. As the verification is based on estimation of various signals, possible measurement errors and poor estimation accuracy affect the accuracy of verification. In WCDMA mode 2, verification typically detects only half of the situations, where a bit error in a feedback word has caused a wrong feedback symbol to be used in transmission control. It should be noted that in those cases, where verification does not detect the use of a wrong feedback symbol, the receiver typically cannot receive information properly. In such cases the use of feedback actually degrades the performance of the system.

Furthermore, errors in feedback information may cause a transmitter to use an unnecessary high transmission power for a certain receiver. This typically causes interference to other receivers.

Regarding WCDMA, it is furthermore noted that WCDMA has two different modes: mode 1 and mode 2. Signal to a receiver may be sent from two antennas of a base station of WCDMA. Either the phase difference of the two signals relating to the two antennas is adjusted while keeping the ratio of the transmission powers fixed (mode 1), or both the phase difference and the amplitudes are adjusted (mode 2). In mode 1, 2-bit feedback words indicate one of four possible phase differences. In mode 2, 4-bit feedback words are needed. Three bits of a feedback word indicate one of eight possible phase differences, and one bit indicates one of two possible amplitude ratios. As mode 2 provides a more sophisticated feedback method, it is expected that the system performance is enhanced by using mode 2 instead of mode 1.

There are thus problems relating to the transmission of feedback information over a noisy channel.

An aim of the present invention is to provide a more reliable method for transmitting feedback information.

SUMMARY OF THE INVENTION

In accordance with a first aspect of the invention, there is provided a method for generating feedback information for controlling transmission from a transmitting end using a set of feedback symbols, said feedback information comprising a set of feedback words, the method comprising:

determining at least one feedback symbol based on at least one signal received from a transmitting end; and determining a feedback word to be transmitted to the transmitting end, said feedback word relating to a determined feedback symbol, using a mapping between a set of feedback symbols and a set of feedback words that takes into account the effect of at least one possible transmission error in transmitting the feedback word to the transmitting end, said mapping between said set of feedback symbols and said set of feedback words being different from a mapping relating to Gray encoding.

In accordance with a second aspect of the invention, there is provided a method of transmitting a feedback word to a transmitting end, the method comprising:

determining at least one feedback symbol based on at least one signal received from a transmitting end;

determining a feedback word to be transmitted to the transmitting end, said feedback word relating to a determined feedback symbol, using a mapping between a set of feedback symbols and a set of feedback words that takes into account an effect of at least one transmission error in transmitting the feedback word to the transmitting end, said mapping between said set of feedback symbols and said set of feedback words being different from a mapping relating to Gray encoding; and transmitting the determined feedback word to the transmitting end.

In accordance with a third aspect of the invention, there is provided a method for receiving feedback information for controlling transmission from a transmitting end using a set of feedback symbols, said feedback information comprising a set of feedback words, the method comprising:

receiving a feedback word; and determining a feedback symbol relating to a received feedback word using a mapping between a set of feedback symbols and a set of feedback words that takes into account the effect of at least one possible transmission error in transmitting a feedback word to a transmitting end, said mapping between said set of feedback symbols and said set of feedback words being different from a mapping relating to Gray encoding.

In accordance with a fourth aspect of the invention, there is provided a method of controlling transmission, said method comprising:

receiving a feedback word;

determining a feedback symbol relating to a received feedback word using a mapping between a set of feedback symbols and a set of feedback words that takes into account an effect of at least one transmission error in transmitting a feedback word to a transmitting end, said mapping between said set of feedback symbols and said set of feedback words being different from a mapping relating to Gray encoding; and controlling transmission from the transmitting end based on a determined feedback symbol.

In accordance with a fifth aspect of the invention, there is provided a device for generating feedback information for controlling transmission from a transmitter using a set of feedback symbols, said feedback information comprising a set of feedback words, the device being configured to determine a feedback symbol based on at least one signal received from the transmitter, and to determine a feedback word to be transmitted, said feedback word relating to a determined feedback symbol, using a mapping between said set of feedback symbols and said set of feedback words that takes into account the effect of at least one possible transmission error in transmitting the feedback word to the transmitter, said mapping between said set of feedback symbols and said set of feedback words being different from a mapping relating to Gray encoding.

In accordance with a sixth aspect of the invention, there is provided a device for receiving feedback information for controlling transmission from a transmitter using a set of feedback symbols, said feedback information comprising a set of feedback words, said set of feedback words being mapped onto said set of feedback symbols, the device being configured to receive a feedback word, and to determine a feedback symbol relating to a received feedback word using a mapping between said set of feedback symbols and said set of feedback words that takes into account the effect of at least one possible transmission error in transmitting the received feedback word, said mapping between said set of feedback symbols and said set of feedback words being different from a mapping relating to Gray encoding.

In accordance with a seventh aspect of the invention, there is provided a device comprising:

first determining means for determining a feedback symbol based on at least one signal received from a transmitting end; and second determining means for determining a feedback word to be transmitted to the transmitting end, said feedback word relating to a determined feedback symbol, using a mapping between a set of feedback symbols and a set of feedback words that takes into account an effect of at least one transmission error in transmitting the feedback word to the transmitting end, said mapping between said set of feedback symbols and said set of feedback words being different from a mapping relating to Gray encoding.

In accordance with an eighth aspect of the invention, there is provided a device comprising:

receiving means for receiving a feedback word; and determining means for determining a feedback symbol relating to the received feedback word using a mapping between a set of feedback symbols and a set of feedback words that takes into account an effect of at least one transmission error in transmitting a feedback word to a transmitting end, said mapping between said set of feedback symbols and said set of feedback words being different from a mapping relating to Gray encoding.

In accordance with a ninth aspect of the invention, there is provided a communication system comprising a first device for generating feedback information for controlling transmission from a second device comprised in the communications system, the first device being configured to determine a feedback symbol based on at least one signal received from the second device, and to determine a feedback word to be transmitted, said feedback word relating to a determined feedback symbol, using a mapping between a set of feedback symbols and a set of feedback words that takes into account an effect of at least one transmission error in transmitting the feedback word to the second device, said mapping between said set of feedback symbols and said set of feedback words being different from a mapping relating to Gray encoding, and the second device being configured to receive a feedback word, and to determine a feedback symbol relating to a received feedback word using said mapping between said set of feedback symbols and said set of feedback words.

The feedback word may be a binary feedback word, and the mapping may be a mapping minimizing an average square Euclidean distance of feedback symbol errors ensuing from a given number of feedback bit errors. The mapping may further minimize the maximum Euclidean distance of feedback symbol errors ensuing from the given number of feedback bit errors within a set of mappings minimizing the average square Euclidean distance of feedback symbols errors ensuing from a given number of feedback bit errors.

The feedback words may be at least three bits long and the feedback symbols of may define various phases. Alternatively, the feedback words may be at least two bits long and the feedback symbols may define various amplitudes. As a further example, the feedback words may be at least two bits long and the feedback symbols may define various amplitude and phase combinations. Furthermore, a feedback word may comprise an at least two bits long first feedback word relating to various amplitudes and an at least one bit long second feedback word, where the first feedback word is determined using the mapping. As a further example, the feedback word may comprise an at least three bits long first feedback word relating to various phases and an at least one bit long second feedback word, and the first feedback word is determined using the mapping.

The determined feedback symbol may be used directly in controlling transmission. In this case, the determined feedback symbol may define an absolute change to transmission or a differential change to transmission. A further option is to determine channel properties estimated at a receiving end based on the feedback symbol and control transmission based on the determined channel properties.

A device for generating feedback information for controlling transmission from a transmitter or a device for receiving feedback information for controlling transmission may be a network element for a communications system or a communications device, for example a mobile station or user equipment, for communicating via the communications system.

Embodiments of the invention may improve performance of a system, where feedback information is transmitted, compared to using Gray encoding for transmitting feedback information. The increase in reliability comes without a complexity increase, as only the mapping between the feedback words and the feedback symbols needs to be modified. After modifying the mapping, there is no need to modify any parts of a transmitter, of a receiver or of a communication system for implementing embodiment of the present invention.

BRIEF DESCRIPTION OF THE DRAWINGS

Embodiments of the present invention will now be described by way of example only with reference to the accompanying drawings, in which:

FIG. 1b shows, as a comparative example, a mapping relating to Gray encoding for the same feedback words and symbols as in FIG. 1a;

FIG. 2b shows, as a comparative example, a mapping relating to Gray encoding for the same feedback words and symbols as in FIG. 2a;

DETAILED DESCRIPTION OF THE INVENTION

Figure 1A:
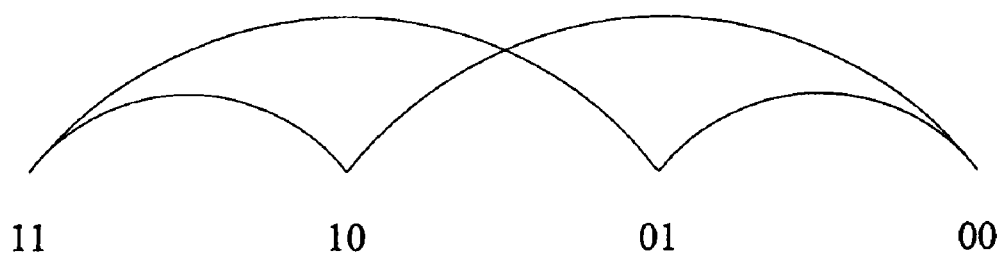
FIG. 1a shows an example of a mapping in accordance with a first embodiment of the invention, where two-bit feedback words are used for controlling amplitude or amplitude and phase jointly.

For better understanding of the examples, details of the feedback control for transmission diversity are first discussed. Lets consider a signal sent on two channels $h_1$ and $h_2$. The received transmission power is $|w_1 h_1 + w_2 h_2|$, where the weights $w_i$ and the channel coefficients $h_i$ are complex numbers. In a selection transmission diversity (STD), one of the two channels is chosen. Typically the selected channel is the one, where a receiver is receiving a stronger signal. In STD the weights are thus either $w_1=1$, $w_2=0$ or $w_1=0$, $w_2=1$. Information about the selection can be transmitted from the receiver to the transmitter using one bit of feedback information.

As a further example, consider WCDMA Mode 1. There the transmission of a signal sent on two channels is controlled by adjusting the phase difference between the channels. The phase difference can be adjusted in steps of 90 degrees. This means that the following combinations of weights $w_1$ and $w_2$ are possible:

| $w_1$ | $1/\sqrt{2}$ | $1/\sqrt{2}$ | $1/\sqrt{2}$ | $1/\sqrt{2}$ |
| $w_2$ | $1/\sqrt{2}$ | $i/\sqrt{2}$ | $-1/\sqrt{2}$ | $-i/\sqrt{2}$ |

These combinations define four possible feedback symbols. Two bits of feedback information are needed to transmit feedback information for WCDMA Mode 1. Mode 1 is also called 2-bit co-phasing.

As an even further example, consider WCDMA Mode 2. There the transmission of a signal sent on two channels is controlled by adjusting the phase difference between the channels and by selecting one of two predetermined ratios of the transmission powers of the two channels. In Mode 2, the one bit of feedback information is transmitted for indicating the selection of $|w_1|=\sqrt{0.2}$, $|w_2|=\sqrt{0.8}$ or $|w_1|=\sqrt{0.8}$, $|w_2|=\sqrt{2}$. Three bits of feedback information define the phase difference of $e^{im\pi/4}$, m=0, ..., 7. There are thus sixteen different feedback symbols in WCDMA Mode 2.

In the embodiments of the invention, binary feedback information about the feedback symbol to be used is transmitted as a feedback word. There is a predetermined mapping between the set of feedback symbols and the set of feedback words. Once a desired feedback symbol has been determined, it is possible to determine the respective feedback word. As mentioned above, in prior art solutions a Gray encoding for the mapping between the feedback symbols and the feedback words has been used, based on the assumption that Gray encoding is effective against errors in transmitting feedback information. A Gray encoding is a coding that minimizes the number of bit errors ensuing from a minimum Euclidean distance symbol error.

In feedback signaling, that is in transmitting feedback information, there is need to be prepared for errors in transmitting the feedback information. The effect of at least one possible transmission error in transmitting the feedback word can be taken into account. In an embodiment of the invention, this is done by minimizing the Euclidean distance of the symbol errors ensuing from a given number of feedback bit errors. The Euclidean distance of symbol errors ensuing from feedback bit errors affects the quality of the signal, whose transmission is controlled using the feedback information. In other words, the Euclidean distance of symbol errors affects the bit error rate in a dedicated channel where the feedback weight (symbol) is applied.

In an embodiment of the present invention, the mapping between the feedback symbols and the feedback words is selected so that the average squared Euclidean distance of feedback symbol errors ensuing from a given number of feedback bit errors is minimized. If there is set of mappings that provide the same average squared Euclidean distance for the feedback symbols errors, the maximum Euclidean distance of the feedback symbol errors ensuing from the given number of feedback errors is minimized.

In many embodiments of the invention, the given number of bit errors can be selected to be one. This is so because the probability of two or more bit errors is typically insignificant compared to the probability of one bit error.

It is possible to find suitable mappings by, for example, evaluating all possible mappings between a set of feedback symbols and a set of feedback words. A mapping with the minimum average squared Euclidean distance of feedback symbol errors ensuing from a given number of feedback bit errors is selected. If needed, the maximum Euclidean distances of feedback symbol errors ensuing from the given number of feedback bit errors are also evaluated for the mappings having the minimum average Euclidean distance. The mapping with minimum maximum distance among the ones with minimum average distance is chosen.

In a first embodiment of the invention, consider two-bit feedback words for controlling amplitude or jointly amplitude and phase of the transmission. That is, the feedback symbol is a quantized real number. The transmission to be controlled may be, for example, transmission from one antenna or transmission from two antennas.

The four feedback symbols relating to the four two-bit feedback words may be symbols of a four-level power amplitude modulation (4-PAM). It is clear that the feedback symbols need not be equally spaced in the feedback symbol constellation. FIG. 1a illustrates one example of a mapping in accordance with the first embodiment of the invention between the feedback words 00, 01, 10 and 11 and the 4-PAM feedback symbols. One-bit error transitions are marked in FIG. 1a. A one-bit error transition means the change in a feedback symbol ensuing from one bit error in feedback words.

The average one bit error Euclidean distance for the mapping illustrated in FIG. 1a is (2·1+2·4)/4=2,5. The maximum Euclidean distance is 2. It is clear that it is possible to rearrange the feedback words on the 4-PAM feedback symbols in another order than the one illustrated in FIG. 1a and still obtain the same average one bit error Euclidean distance and the maximum Euclidean distance.

For amplitude control, the four feedback symbols may define four different amplitude levels. The amplitude levels may be equally spaced or at various distances. For joint amplitude and phase control, the four feedback symbols may define two different amplitude levels for two different phase differences.

Figure 1B:
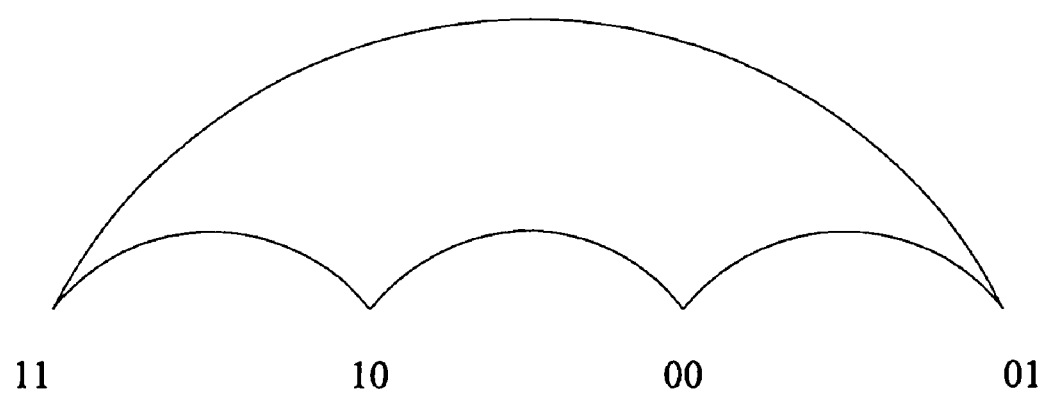

As a comparative example, FIG. 1b shows an example of a mapping relating to Gray encoding four two-bit feedback words onto four 4-PAM feedback symbols.

Again the one bit error transitions are marked. The average one bit error Euclidean distance for the mapping illustrated in FIG. 1b is (3·1+9)/4=3. For Gray encoding, the maximum Euclidean distance is 3.

Figure 2A:
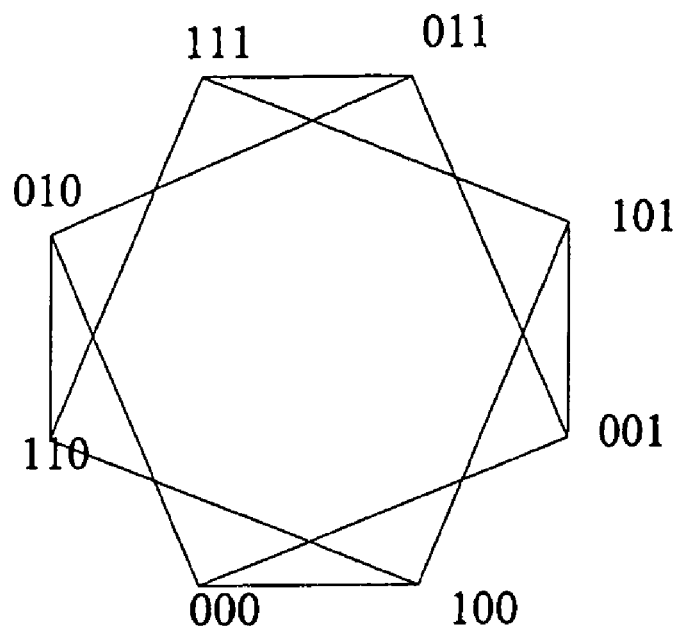
FIG. 2a shows an example of a mapping in accordance with a second embodiment of the invention, where three-bit feedback words are used for controlling phase.

In a second embodiment of the invention, three-bit feedback words are used to indicate eight different phase differences. FIG. 2a shows an example of a mapping between the eight feedback words the eight feedback symbols. The feedback symbols illustrated in FIG. 2a are eight phase shift keying (8-PSK) modulation symbols. All one bit error transitions are marked in FIG. 2a. If the feedback symbols are normalized so that they lie on the circle with radius 1, the average one bit error Euclidean distance for the mapping illustrated in FIG. 2a is $(4(2\sin(\pi/8))^2+8(2\sin(\pi/4))^2)/12=4(\sin^2(\pi/8)+1)/3$, and the maximum Euclidean distance is $(2\sin(\pi/4))^2$, corresponding to a phase difference of 90°.

Figure 2B:
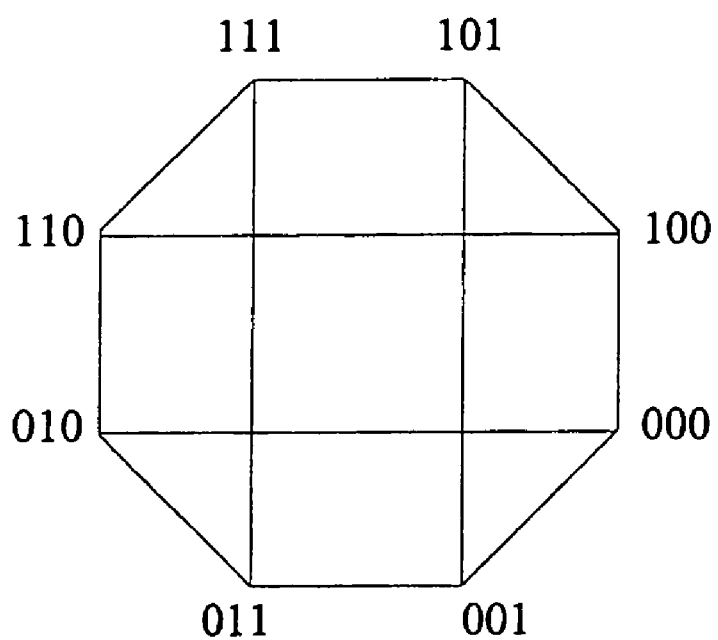

As a comparative example, FIG. 2b shows an example of a mapping relating to Gray encoding eight three-bit feedback words onto eight 8-PSK feedback symbols. Again the one bit error transitions are marked. The average one bit error Euclidean distance for the mapping illustrated in FIG. 2b is $(8(2\sin(\pi/8))^2+4(2\sin(3\pi/8))^2)/12=4(\sin^2(\pi/8)+1)/3$, so it is equal to the mapping in accordance with the second embodiment of the invention illustrated in FIG. 2a. For Gray encoding, the maximum Euclidean distance is, however, $(2\sin(3\pi/8))^2$, corresponding to a phase difference of 135°.

Performance in a simple feedback system employing two transmission antennas has been studied using simulations. As a concrete example of the second embodiment of the invention, a 3-bit co-phasing algorithm is considered, where the phase difference between two channels is fed back using 8-PSK quantization.

Figure 3:
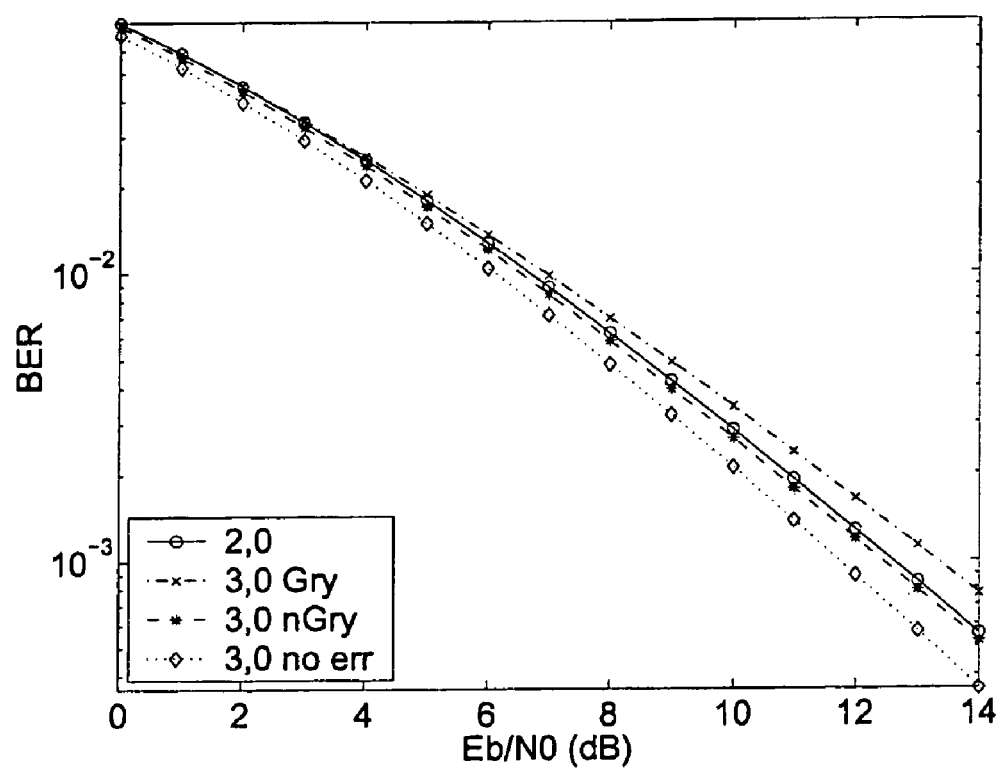
FIG. 3 shows simulated performance results for a simple feedback system employing the second embodiment of the invention and for a reference system employing Gray encoding, the bit error rate for feedback signaling being 4%.

The legend in FIG. 3 and other Figures showing the simulation results notation x,y means that x bits are used for phase feedback and y bits are used for amplitude feedback. "Gry" means that the mapping between the feedback symbols and feedback words is the Gray encoding used in prior art. "nGry" means that the mapping between the feedback symbols and feedback words is in accordance with embodiments of the invention. "no err" refers to system performance without errors in feedback information. "no err" is insensitive to the mapping between the feedback symbols and feedback words, and it serves as a reference. No verification is assumed in the reported performance figures.

Figure 4:
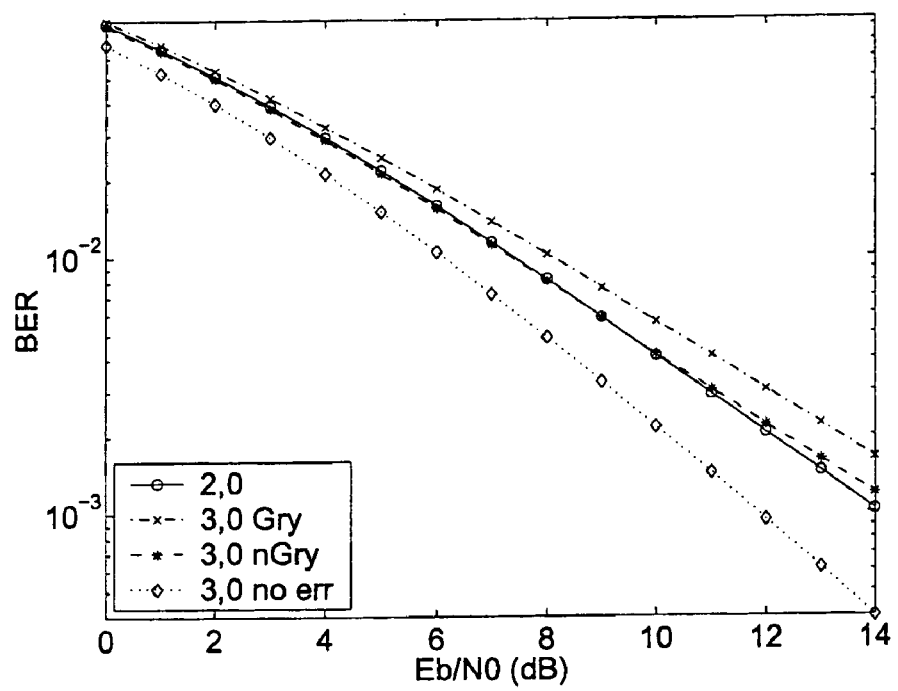
FIG. 4 shows further simulated performance results for the same systems as FIG. 3, the bit error rate for feedback signaling being 10%.

FIG. 3 shows bit error rate (BER) as function of signal strength, more precisely as function of $E_b/N_0$, when the feedback bits are subjected to a 4% feedback error rate. FIG. 4 shows similar results, but for a 10% feedback bit error rate. The notation 2,0 in the legends of FIGS. 3 and 4 indicates 2-bit co-phasing, that is Mode 1 in WCDMA. These results serve as a reference for studying the effect of having an extra feedback bit.

FIGS. 3 and 4 show that with Gray encoding, there is no gain from the third feedback bit when the feedback channel is subject to errors. This can be seen by comparing curves "2,0" and "3,0 Gry" in FIGS. 3 and 4. When a mapping in accordance with the second embodiment of the invention is applied, a small gain from the third feedback bit may be seen by comparing curves "3,0 nGry" to curve "2,0". Note that the signal-to-noise (SNR) gain from the third feedback bit is about 0.14 dB, when there are no feedback errors. With feedback errors, the SNR gains of the two encoding methods are the same, which is a consequence of them having the same average square Euclidian distance. The performance, however, is different for feedback schemes employing the Gray encoding and the second embodiment of the invention. This can be seen by comparing curves "3,0 Gry" and "3,0 nGry" in FIGS. 3 and 4. This difference in performance is a consequence of the fact that for larger feedback symbol errors, diversity is lost for the Gray encoding. Thus the feedback scheme employing the second embodiment of the invention, having smaller maximum symbol errors arising from one feedback bit errors, loses less of the diversity and performs better.

FIG. 3 shows that with 4% feedback error rate, the feedback scheme employing the second embodiment of the present invention, manages to maintain approximately the theoretical SNR gain of 0.14 dB when compared to 2-bit co-phasing (mode 1). See curves "3,0 nGry" and "2,0" for this effect. On the other hand, the feedback scheme employing Gray encoding loses to 2-bit co-phasing with up to 0.5 dB. See curves "2,0" and "3,0 Gry" in FIGS. 3 and 4 for this effect.

In a third embodiment of the invention, four-bit feedback words are used for controlling jointly amplitude and phase. Furthermore, the non-Gray encoding is applied on the phase quantization. As a concrete example, consider WCDMA Mode 2, which applies 3-bit phase quantization (8-PSK) and one-bit amplitude quantization. A mapping, which minimizes the average squared Euclidean distance of feedback symbol errors ensuing from one bit feedback errors, is used in the phase quantization.

Figure 5:
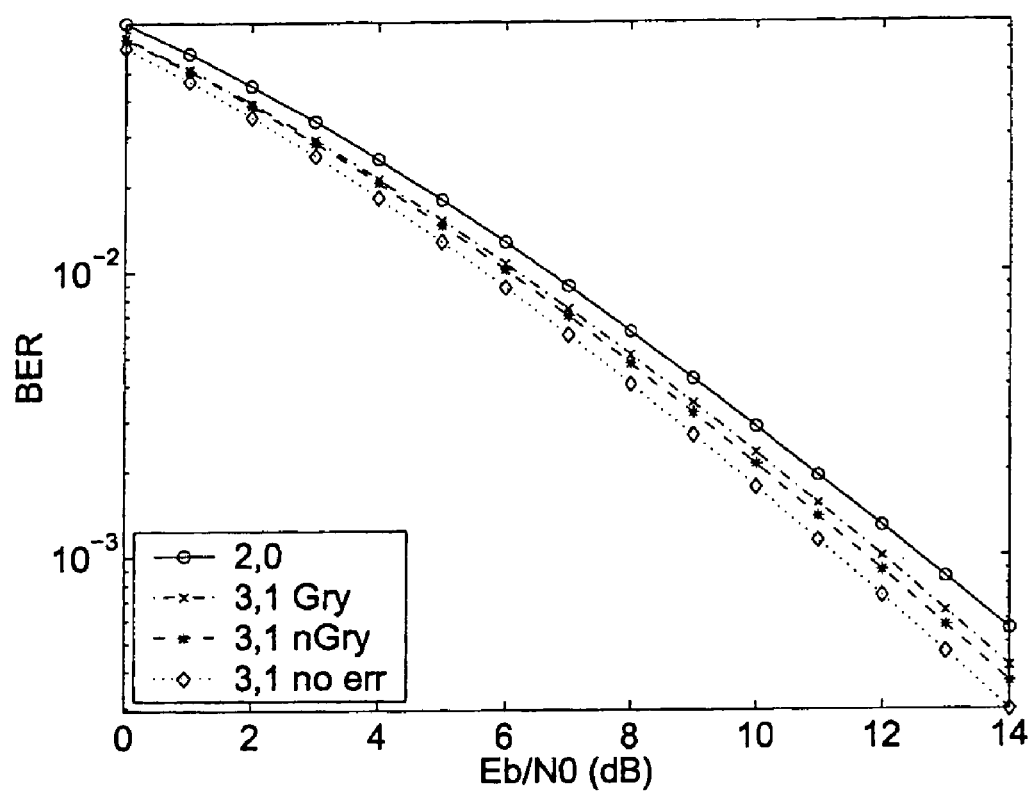
FIG. 5 shows simulated performance results for a WCDMA Mode 2 feedback algorithm employing three-bit feedback words for joint phase and amplitude control in accordance with a third embodiment of the invention and for a reference algorithm employing Gray encoding, in the simulation the bit error rate for feedback signaling is 4%.
Figure 6:
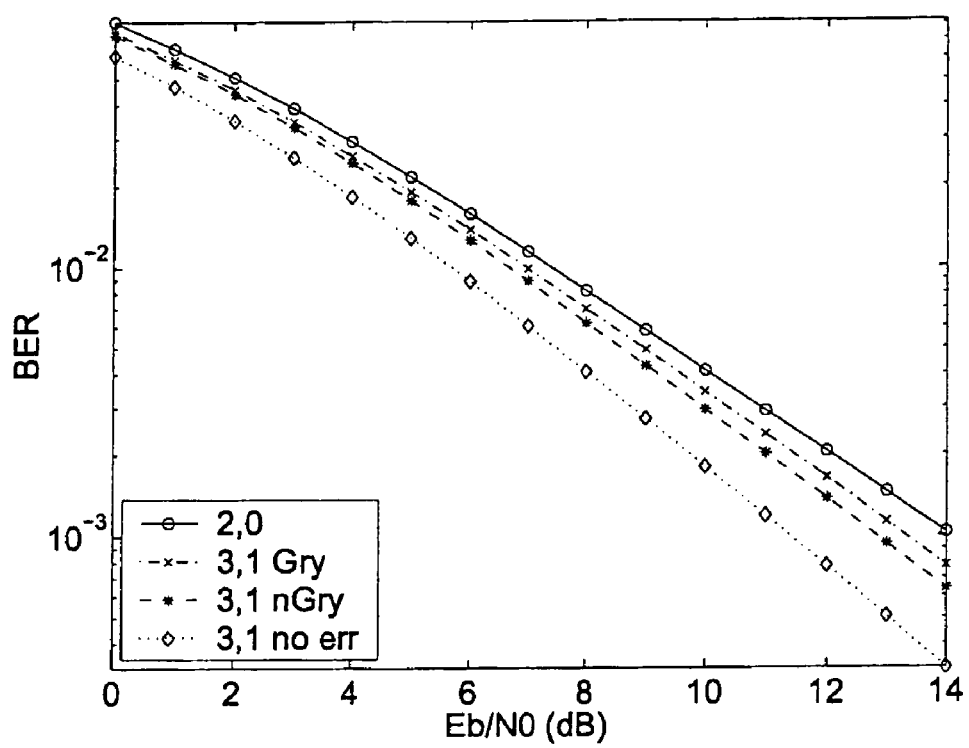
FIG. 6 shows further simulated performance results for the same algorithms as FIG. 5, the bit error rate for feedback signaling being 10%.

FIGS. 5 and 6 show simulation results relating to WCDMA Mode 2. FIG. 5 shows performance results when the feedback bits are subjected to a 4% feedback error rate, and in FIG. 6 the feedback error rate is 10%. Similarly as in FIGS. 3 and 4, in FIGS. 5 and 6 "2,0" refers to Mode 1 feedback scheme. "3,1 Gry" refers to Gray encoding used in the phase quantization. "3,1 nGry" refers to the feedback scheme in accordance with the third embodiment of the invention.

The SNR gains in the presence of feedback errors for both mappings are the same. This is a result of the fact that the average square Euclidean distance is the same for both the Gray encoding and for the third embodiment of the invention. The feedback scheme employing the third embodiment of the invention preserves the diversity gain better. The performance gains of using a feedback scheme in accordance with the third embodiment of the invention instead of using a feedback scheme employing Gray encoding can be found in Table 1. The gains are quite small, but it should be noted that they come for free.

TABLE 1

Performance gains for using non-Gray encoding compared to using Gray encoding for phase bits in Mode 2

| Feedback | Gain at Eb/N0 = | | |
|---|---|---|---|
| error rate | 0 dB | 6 dB | 12 dB |
| 4% | 0.06 dB | 0.1 dB | 0.2 dB |
| 10% | 0.13 dB | 0.21 dB | 0.39 dB |

In a fourth embodiment of the invention, amplitude and phase feedback are also controlled jointly. In the fourth embodiment, the non-Gray encoding is applied on the amplitude feedback. As an example, consider feedback information where two bits are for phase feedback and two bits are for amplitude feedback. For the amplitude feedback it is possible to use the prior art Gray encoding (see FIG. 1b) or a mapping illustrated in FIG. 1a. For the phase feedback, Gray mapping is a mapping minimizing the average square Euclidean distance of feedback symbols errors ensuing from one bit feedback errors.

Figure 7:
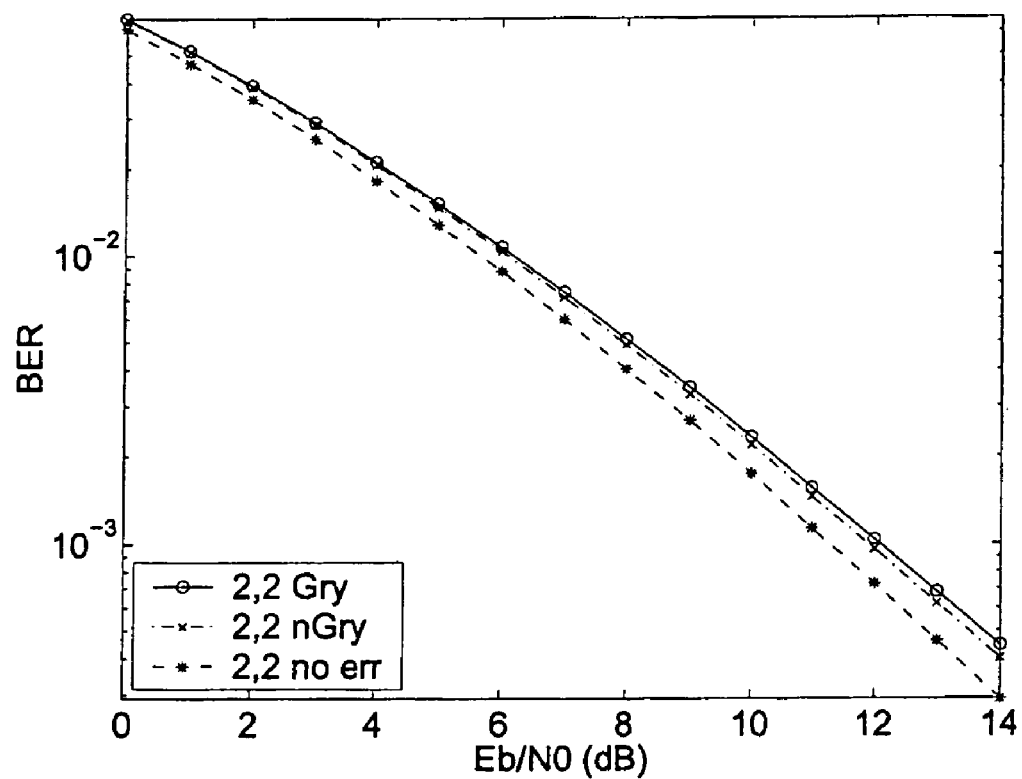
FIG. 7 shows simulated performance results for a feedback system employing a fourth embodiment of the invention, where four-bit feedback words are used for jointly controlling phase and amplitude, the bit error rate for feedback signaling being 4%.
Figure 8:
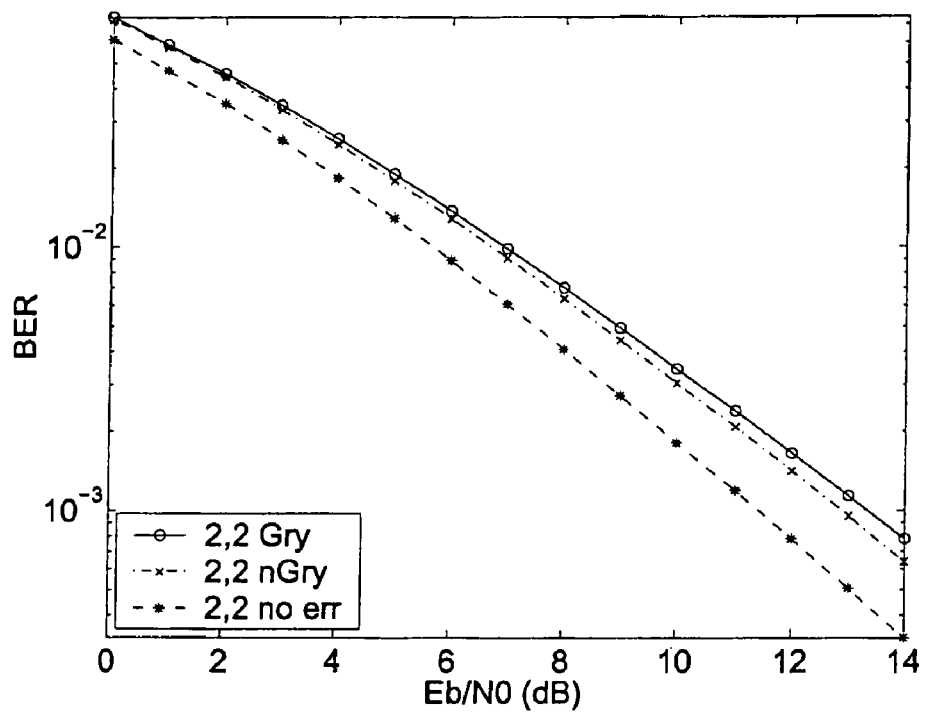
FIG. 8 shows further simulated performance results for the same algorithms as FIG. 7, the bit error rate for feedback signaling being 4%.

FIGS. 7 and 8 illustrate the performance results of feedback schemes employing Gray encoding and the fourth embodiment of the invention. FIG. 7 shows simulation results when the feedback bits are subject to a 4% bit error rate, and FIG. 8 for a 10% bit error rate. The performance gains arising from employing the fourth embodiment of the invention are comparable to those arising from employing the third embodiment of the invention in connection with WCDMA Mode 2.

Figure 9:
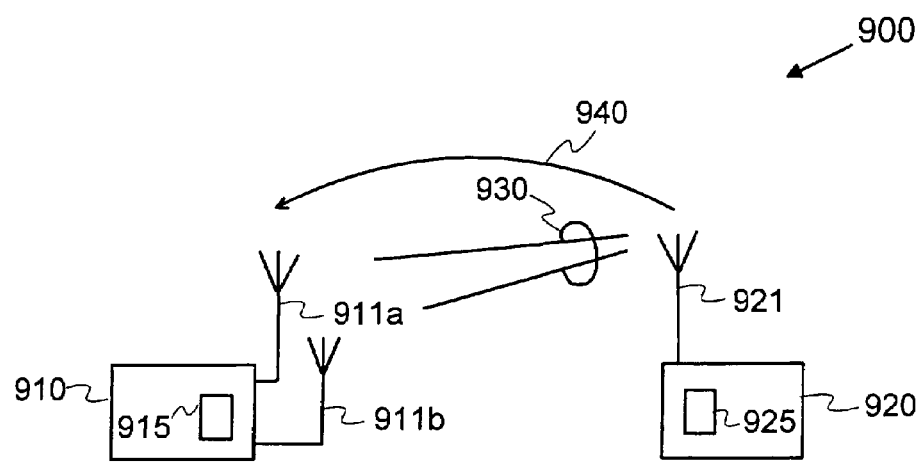
FIG. 9 shows schematically a communication system with which embodiments of the invention can be used.

FIG. 9 shows schematically a communication system 900 with which embodiments of the invention can be used. The communication system 900 comprises a first network element 910 having, as an example, two antennas 911. The first network element 910 transmits information to a second network element 920 using the two antennas. This is illustrated in FIG. 9 by lines 930. The second network element 920 has, as an example, one antenna 921 for receiving signals. The second network element 920 is provided with a controller 925, which is able to determine a feedback symbol, which the second network element 920 would wish the first network element 910 to use for adjusting the transmission.

The controller 925 uses a mapping, which is different from the mapping relating to Gray encoding and which takes into account possible transmission errors for the feedback information, for determining a feedback word to be sent to the first network element 910. This feedback is then sent typically unprotected over a wireless link (arrow 940 in FIG. 9). The first network element 910 receives the feedback word, and a controller 915 determines the respective feedback symbol. The determined feedback symbol is then used in controlling the transmission of signals to the second network element 920.

In a cellular system, the first network element 910 may be a base station (or a corresponding network element) of the cellular system. It is noted that in a cellular network element, the control of the radio resources may be provided in a separate network element. Such a separate network element is often called a radio resource controller. Alternatively, the feedback information may be processed locally in a base station. In a cellular system, the second network element 920 may be user equipment.

It is, however, appreciated that the first network element and the second network element may be any network elements of a communication system, where feedback information is provided for controlling transmission from the first network element to the second network element.

For determining the feedback symbol, which the first network element 910 should use in transmission control, the second network element 920 typically needs information about the channel coefficients. For this purpose, the controller 925 is typically configured to estimate channel coefficients of the reception channels.

Figure 10:
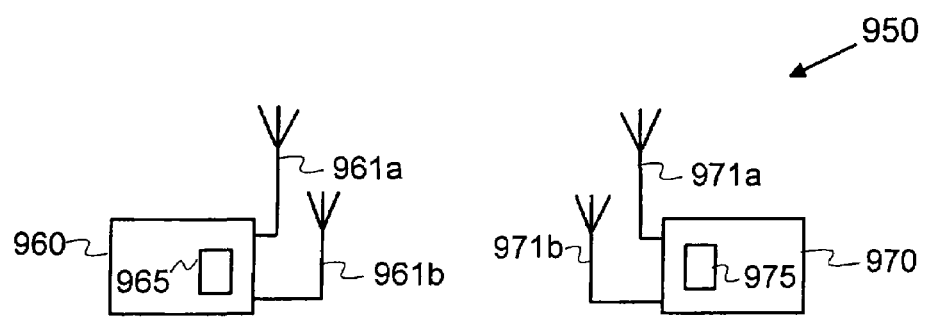
FIG. 10 shows schematically a MIMO system with which embodiments of the invention can be used.

FIG. 10 shows schematically a MIMO (multiple input, multiple output) system 950 with which embodiments of the invention can be used. A MIMO system is a system, which consists of multiple ($N_T$) transmitting antennas and multiple ($N_r$) receiving antennas. In a MIMO system comprising one user, the user signal can be distributed between the transmitting antennas and sent to the multiple receiving antennas of the single users. The benefit of a MIMO system is that by combining the data is certain ways at the transmitting end and at the receiving end, the overall quality (bit error rate BER) or the capacity (bit rate) of the system can be improved. The MIMO system 950 comprises a transmitter 960 and a receiver 970. The transmitter 960 comprises a plurality of transmission antennas 961, and the receiver 970 comprises a plurality of receiving antennas 971.

Similarly as the first and second network elements in FIG. 9, also the MIMO transmitter 960 and the MIMO receiver 970 comprise controllers 965, 975. The controller 975 is able to determine a feedback symbol, which the MIMO receiver 970 would wish the MIMO transmitter 960 to use for adjusting the transmission. The controller 975 uses a mapping, which is different from the mapping relating to Gray encoding and which takes into account possible transmission errors for the feedback information, for determining a feedback word to be sent to the MIMO transmitter 960. The controller 965 in the MIMO transmitter 960 uses the same mapping for determining the feedback symbol respective to the received feedback word. To be precise, in the receiver a mapping from feedback symbols to feedback words is used. In the transmitter, an inverse mapping from feedback words to feedback symbols is used. In this description and in the appending claims, a mapping between feedback symbols and feedback words is used to refer to both mappings. From the connection, it is clear to one skilled in the art which mapping is being referred to.

The controller 975 is typically configured to determine channel information about the MIMO channel. In FDD systems the channel from the MIMO transmitter 960 to the MIMO receiver 970 is different from the channel in the opposite direction. In a lowly changing environment, where good channel estimates of the matrix channel exist at the MIMO receiver 970, part of this may be conveyed to the MIMO transmitter 960. Based on the feedback information, the target is to construct $N \leq \min (N_T, N_r)$ beams at the MIMO transmitter 960, which can be independently received at the MIMO receiver 970.

In a MIMO system, the feedback information typically represents channel properties at the MIMO receiver.

Above, different example of feedback information has been discussed. In general, the embodiments of the invention are applicable in any radio communication system, where phase feedback with more than 2 bits or amplitude feedback or joint phase/amplitude feedback with more than 1 bit is applied.

It is appreciated that the feedback may be based on long or short term information. The feedback information may describe channel information (phase, amplitude, power control) or any other information pertinent for setting up a communication link. The feedback information may thus be any digitized real or complex numbers.

The invention is not restricted to using any specific feedback symbols discussed above. In addition to the example given above, 16-QAM (quadrature amplitude modulation) symbols, for example, may be used as feedback symbols for controlling phase and amplitude jointly.

It is furthermore appreciated that although many specific examples above relate to controlling diversity transmission, the feedback information may be provided for controlling any transmission, including a transmission of a signal from a single antenna. Power control is one example of controlling a signal transmitted from a single antenna. The invention is furthermore applicable in providing feedback information in a MIMO system.

It is appreciated that the feedback information may indicate a feedback symbol, which the transmitter should use for controlling the transmission. Alternatively, the feedback information may describe the channel properties (phase, amplitude, received power) estimated at the receiver. In this case, the transmitter determines the proper manner to control the transmission based on the feedback information provided by the receiver.

It is also appreciated that although the examples above relate to feedback information indicating absolute quantities controlling transmission, the invention is applicable also for providing differential feedback information.

It is appreciated that feedback information may be generated in a communications system for controlling transmission from a communications device, for example, from a mobile station or from user equipment. Alternatively feedback information may be generated in a communications device for controlling transmission from a communications system to the communications device. Similarly, the transmission control based on feedback information may take place in a communication system or in a communications device. In other words, the invention is applicable for controlling transmission in the uplink direction or in the downlink direction in a cellular communications system.

It is furthermore appreciated that although the examples described above relate to a WCDMA system, the present invention is applicable in any system where feedback information is transmitted digitally.

Although preferred embodiments of the apparatus and method embodying the present invention have been illustrated in the accompanying drawings and described in the foregoing detailed description, it will be understood that the invention is not limited to the embodiments disclosed, but is capable of numerous rearrangements, modifications and substitutions without departing from the spirit of the invention as set forth and defined by the following claims.

The invention claimed is:

1. A method for generating feedback information for controlling transmission from a transmitting end using a set of feedback symbols, said feedback information comprising a set of feedback words, the method comprising:

determining at least one feedback symbol based on at least one signal received from a transmitting end; and determining a feedback word to be transmitted to the transmitting end, said feedback word relating to a determined feedback symbol, using a mapping between a set of feedback symbols and a set of feedback words that takes into account an effect of at least one transmission error in transmitting the feedback word to the transmitting end, said mapping between said set of feedback symbols and said set of feedback words being different from a mapping relating to Gray encoding, wherein determining the feedback word comprises determining a binary feedback word comprised in the feedback word by the mapping between said set of feedback symbols and said feedback words, the mapping minimizing an average square Euclidean distance of feedback symbol errors ensuing from a given number of feedback bit errors.

2. The method as defined in claim 1, wherein said given number of feedback errors is one feedback bit error.

3. The method as defined in claim 1, wherein belongs to a set of mappings minimizing an average square Euclidean distance of feedback symbols errors ensuing from a given number of feedback bit errors, the mapping further minimizing the maximum Euclidean distance of feedback symbol errors ensuing from the given number of feedback bit errors within said set of mappings.

4. The method as defined in claim 1, wherein belongs to a set of mappings minimizing an average square Euclidean distance of feedback symbols errors ensuing from one feedback bit error, the mapping further minimizing the maximum Euclidean distance of feedback symbol errors ensuing from one feedback bit error.

5. The method as defined in claim 1, wherein the feedback word is determined using the mapping between said set of feedback symbols and said set of feedback words, feedback words of said set of feedback words being at least three bits long and feedback symbols of said set of feedback symbols defining various phases.

6. The method as defined in claim 1, wherein the feedback word is determined using the mapping between said set of feedback symbols and said set of feedback words, feedback words of said set of feedback words being at least two bits long and feedback symbols of said set of feedback symbols defining various amplitudes.

7. The method as defined in claim 1, wherein the feedback word is determined using the mapping between said set of feedback symbols and said set of feedback words, feedback words of said set of feedback words being at least two bits long and feedback symbols of said set of feedback symbols defining various amplitude and phase combinations.

8. A method for generating feedback information for controlling transmission from a transmitting end using a set of feedback symbols, said feedback information comprising a set of feedback words, the method comprising:
determining at least one feedback symbol based on at least one signal received from a transmitting end; and
determining a feedback word to be transmitted to the transmitting end, said feedback word relating to a determined feedback symbol, using a mapping between a set of feedback symbols and a set of feedback words that take into account an effect of at least one transmission error in transmitting the feedback word to the transmitting end, said mapping between said set of feedback symbols and said set of feedback words being different from a mapping relating to Gray encoding, wherein determining the feedback word comprises determining an at least two bits long first feedback word relating to various amplitudes and an at least one bit long second feedback word, the feedback word comprising said first feedback word and said second feedback word, said first feedback word being determined using a mapping between a set of at least two bits long first feedback words and said set of feedback symbols taking into account said at least one transmission error in transmitting the first feedback word.

9. A method for generating feedback information for controlling transmission from a transmitting end using a set of feedback symbols, said feedback information comprising a set of feedback words, the method comprising:
determining at least one feedback symbol based on at least one signal received from a transmitting end; and
determining a feedback word to be transmitted to the transmitting end, said feedback word relating to a determined feedback symbol, using a mapping between a set of feedback symbols and a set of feedback words that takes into account an effect of at least one transmission error in transmitting the feedback word to the transmitting end, said mapping between said set of feedback symbols and said set of feedback words being different from a mapping relating to Gray encoding, wherein determining the feedback word comprises determining an at least three bits long first feedback word relating to various phases and an at least one bit long second feedback word, the feedback word comprising said first feedback word and said second feedback word, said first feedback word being determined using a mapping between a set of at least three bits long first feedback words and said set of feedback symbols taking into account said at least one transmission error in transmitting the first feedback word.

10. A method of transmitting a feedback word to a transmitting end, the method comprising:
determining at least one feedback symbol based on at least one signal received from a transmitting end;
determining a feedback word to be transmitted to the transmitting end, said feedback word relating to a determined feedback symbol, using a mapping between a set of feedback symbols and a set of feedback words that takes into account an effect of at least one transmission error in transmitting the feedback word to the transmitting end, said mapping between said set of feedback symbols and said set of feedback words being different from a mapping relating to Gray encoding wherein determining the feedback word comprises determining a binary feedback word comprised in the feedback word by the mapping between said set of feedback symbols and said feedback words, the mapping minimizing an average sciuare Euclidian distance of feedback symbol errors ensuing from a given number of feedback bit errors; and
transmitting the determined feedback word to the transmitting end.

11. A method for receiving feedback information for controlling transmission from a transmitting end using a set of feedback symbols, said feedback information comprising a set of feedback words, the method comprising:
receiving a feedback word; and
determining a feedback symbol relating to a received feedback word using a mapping between a set of feedback symbols and a set of feedback words that takes into account an effect of at least one transmission error in transmitting a feedback word to a transmitting end, said mapping between said set of feedback symbols and said set of feedback words being different from a mapping relating to Gray encoding, wherein determining the feedback word comprises determining a binary feedback word comprised in the feedback word by the mapping between said set of feedback symbols and said feedback words, the mapping minimizing an average square Euclidean distance of feedback symbol errors ensuing from a given number of feedback bit errors.

12. A method of controlling transmission, said method comprising:
receiving a feedback word;
determining a feedback symbol relating to a received feedback word using a mapping between a set of feedback symbols and a set of feedback words that takes into account an effect of at least one transmission error in transmitting a feedback word to a transmitting end, said mapping between said set of feedback symbols and said set of feedback words being different from a mapping relating to Gray encoding, wherein determining the feedback word comprises determining a binary feedback word comprised in the feedback word by the mapping between said set of feedback symbols and said feedback words, the mapping minimizing an average square Euclidean distance of feedback symbol errors ensuing from a given number of feedback bit errors; and
controlling transmission from the transmitting end based on a determined feedback symbol.

13. The method as defined in claim 12, wherein the controlling comprises using the determined feedback symbol directly in controlling transmission.

14. The method as defined in claim 12, wherein the controlling comprises using the determined feedback symbol directly in controlling transmission, said determined feedback symbol defining an absolute change to transmission.

15. The method as defined in claim 12, wherein the controlling comprises using the determined feedback symbol directly in controlling transmission, said determined feedback symbol defining a differential change to transmission.

16. The method as defined in claim 12, wherein the controlling comprises determining based on the feedback symbol channel properties estimated at a receiving end, said receiving end receiving transmission from said transmitting end, and controlling transmission based on determined channel properties.

17. A device for generating feedback information for controlling transmission from a transmitter using a set of feedback symbols, said feedback information comprising a set of feedback words, the device being configured
to determine a feedback symbol based on at least one signal received from the transmitter, and
to determine a feedback word to be transmitted, said feedback word relating to a determined feedback symbol, using a mapping between a set of feedback symbols and a set of feedback words that takes into account an effect of at least one transmission error in transmitting the feedback word to the transmitter, said mapping between said set of feedback symbols and said set of feedback words being different from a mapping relating to Gray encoding, determining the feedback word comprises determining a binary feedback word comprised in the feedback word by the mapping between said set of feedback symbols and said feedback words, the mapping minimizing an average square Euclidean distance of feedback symbol errors ensuing from a given number of feedback bit errors.

18. The device as defined in claim 17, the device being further configured to transmit the determined feedback word.

19. The device as defined in claim 17, the device comprising a receiver for signals transmitted from the transmitter.

20. The device as defined in claim 17, the device comprising a network element for a communication system.

21. The device as defined in claim 17, the device comprising a communication device for communications via a communication system.

22. A device for receiving feedback information for controlling transmission from a transmitter using a set of feedback symbols, said feedback information comprising a set of feedback words, said set of feedback words being mapped onto said set of feedback symbols, the device being configured
to receive a feedback word, and
to determine a feedback symbol relating to a received feedback word using a mapping between a set of feedback symbols and a set of feedback words that takes into account an effect of at least one transmission error in transmitting the received feedback word, said mapping between said set of feedback symbols and said set of feedback words being different from a mapping relating to Gray encoding, wherein determining the feedback word comprises determining a binary feedback word comprised in the feedback word by the mapping between said set of feedback symbols and said feedback words, the mapping minimizing an average Euclidean distance of feedback symbol errors ensuing from a given number of feedback bit errors.

23. The device as defined in claim 22, the device being further configured to control the transmission using a determined feedback symbol.

24. The device as defined in claim 22, the device comprising a transmitter.

25. The device as defined in claim 22, the device comprising a network element for a communication system.

26. The device as defined in claim 22, the device comprising a communication device for communications via a communication system.

27. A device comprising:
first determining means for determining a feedback symbol based on at least one signal received from a transmitting end; and
second determining means for determining a feedback word to be transmitted to the transmitting end, said feedback word relating to a determined feedback symbol, using a mapping between a set of feedback symbols and a set of feedback words that takes into account an effect of at least one transmission error in transmitting the feedback word to the transmitting end, said mapping between said set of feedback symbols and said set of feedback words being different from a mapping relating to Gray encoding, wherein determining the feedback word comprises determining a binary feedback word comprised in the feedback word by the mapping between said set of feedback symbols and said feedback words, the mapping minimizing an average square Euclidean distance of feedback symbol errors ensuing from a given number of feedback bit errors.

28. A device comprising:
receiving means for receiving a feedback word; and
determining means for determining a feedback symbol relating to the received feedback word using a mapping between a set of feedback symbols and a set of feedback words that takes into account an effect of at least one transmission error in transmitting a feedback word to a transmitting end, said mapping between said set of feedback symbols and said set of feedback words being different from a mapping relating to Gray encoding, wherein determining the feedback word comprises determining a binary feedback word comprised in the feedback word by the mapping between said set of feedback symbols and said feedback words, the mapping minimizing an average square Euclidean distance of feedback symbol errors ensuing from a given number of feedback bit errors.

29. A communication system comprising a first device for generating feedback information for controlling transmission from a second device comprised in the communications system, the first device being configured to determine a feedback symbol based on at least one signal received from the second device, and to determine a feedback word to be transmitted, said feedback word relating to a determined feedback symbol, using a mapping between a set of feedback symbols and a set of feedback words that takes into account an effect of at least one transmission error in transmitting the feedback word to the second device, said mapping between said set of feedback symbols and said set of feedback words being different from a mapping relating to Gray encoding, and the second device being configured to receive a feedback word, and to determine a feedback symbol relating to a received feedback word using said mapping between said set of feedback symbols and said set of feedback words, wherein determining the feedback word comprises determining a binary feedback word comprised in the feedback word by the mapping between said set of feedback symbols and said feedback words, the mapping minimizing an average square Euclidean distance of feedback symbol errors ensuing from a given number of feedback bit errors.

* * * * *